(12) United States Patent
Whitaker et al.

(10) Patent No.: US 10,939,296 B2
(45) Date of Patent: Mar. 2, 2021

(54) VEHICLE SMART CONNECTION

(71) Applicant: Ford Global Technologies, LLC, Dearborn, MI (US)

(72) Inventors: Matthew Atwood Whitaker, Cupertino, CA (US); Patrick Ellis, San Jose, CA (US); Henry Salvatore Savage, Mountain View, CA (US); Christopher Weir, Mountain View, CA (US); Subhransu Mishra, Santa Clara, CA (US); Andreas Arvanitis, Gilroy, CA (US); Lionel Ronald Sequeira, Sunnyvale, CA (US); Anuja Anil Shirsat, Mountain View, CA (US); Hansel Mauricio Monroy, San Jose, CA (US); Owen Carpenter, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 16/105,181

(22) Filed: Aug. 20, 2018

(65) Prior Publication Data
US 2020/0059787 A1 Feb. 20, 2020

(51) Int. Cl.
*H04L 29/06* (2006.01)
*H04W 12/08* (2021.01)
*H04W 12/06* (2021.01)
*G06F 9/54* (2006.01)

(52) U.S. Cl.
CPC ............ *H04W 12/08* (2013.01); *G06F 9/547* (2013.01); *H04L 63/0853* (2013.01); *H04L 63/107* (2013.01); *H04L 63/108* (2013.01); *H04L 63/1416* (2013.01); *H04W 12/06* (2013.01)

(58) Field of Classification Search
None
See application file for complete search history.

(56) References Cited

U.S. PATENT DOCUMENTS

| 7,761,910 B2 * | 7/2010 | Ransom .................... G06F 1/28 |
| | | 726/6 |
| 8,228,861 B1 * | 7/2012 | Nix ........................ H04W 36/00 |
| | | 370/329 |
| 9,521,238 B1 | 12/2016 | Thanayankizil et al. |
| 10,602,329 B2 * | 3/2020 | Addepalli ............. B60R 16/023 |

(Continued)

OTHER PUBLICATIONS

Eiza, Mahmoud Hashem et al. Secure and Privacy-Aware Proxy Mobile IPv6 Protocol for Vehicle-to-Grid Networks. 2016 IEEE International Conference on Communications (ICC). https://ieeexplore.ieee.org/stamp/stamp.jsp?tp=&arnumber=7510934 (Year: 2016).*

(Continued)

*Primary Examiner* — Jeremiah L Avery
(74) *Attorney, Agent, or Firm* — Brooks Kushman PC; Michael Spenner

(57) ABSTRACT

A vehicle includes a controller, programmed to responsive to wirelessly connecting to a mobile device using a mobile credential issued from a server within a time frame specified in the mobile credential, issue an access token to the mobile device, and responsive to receiving a command authorized by the access token from the mobile device, route the command to a vehicle subsystem for execution.

17 Claims, 6 Drawing Sheets

(56) References Cited

U.S. PATENT DOCUMENTS

| | | | | |
|---|---|---|---|---|
| 2006/0129691 | A1* | 6/2006 | Coffee | H04L 67/04 |
| | | | | 709/230 |
| 2014/0309806 | A1* | 10/2014 | Ricci | G06Q 10/02 |
| | | | | 701/1 |
| 2014/0309870 | A1* | 10/2014 | Ricci | G05D 1/0016 |
| | | | | 701/36 |
| 2016/0086391 | A1* | 3/2016 | Ricci | G06Q 10/10 |
| | | | | 701/29.3 |
| 2016/0087933 | A1* | 3/2016 | Johnson | H04W 4/70 |
| | | | | 709/245 |
| 2016/0099972 | A1* | 4/2016 | Qureshi | H04L 67/10 |
| | | | | 726/1 |
| 2016/0112262 | A1* | 4/2016 | Johnson | H04L 61/1511 |
| | | | | 709/221 |
| 2016/0196131 | A1* | 7/2016 | Searle | H04L 29/06 |
| | | | | 717/173 |
| 2016/0212695 | A1* | 7/2016 | Lynch | H04W 48/06 |
| 2016/0366711 | A1 | 12/2016 | Shanbhag | |
| 2017/0078922 | A1* | 3/2017 | Raleigh | H04W 28/10 |
| 2018/0026973 | A1* | 1/2018 | Le Saint | H04W 12/0608 |
| | | | | 713/168 |

OTHER PUBLICATIONS

Roh, Hyosun; Jung, Souhwan. Session Key Exchange and Mutual Authentication Scheme between Mobile Machines in WLAN based Ad Hoc Networks. 2010 International Conference on Information and Communication Technology Convergence (ICTC). https://ieeexplore.ieee.org/stamp/stamp.jsp?tp=&arnumber=5674797 (Year: 2010).*

\* cited by examiner

VEHICLE SMART CONNECTION

TECHNICAL FIELD

The present disclosure is generally related to a vehicle wireless connection system. More specifically, the present disclosure is related to a vehicle wireless network system allowing an authorized user device to connect without manual input of security credentials.

BACKGROUND

In-vehicle wireless connection services, such as a WiFi hotspot, allow a user to connect to a vehicle system wirelessly via a user device, such as a cell phone. Once connected, the user device may have access to the vehicle system to perform various operations. For security purposes, a new user device may need a password the first time to connect to the vehicle system. This password is usually manually input by the user and stored for repeated access to the network over time.

SUMMARY

In one or more illustrative embodiments of the present disclosure, a vehicle includes a controller, programmed to responsive to wirelessly connecting to a mobile device using a mobile credential issued from a server within a time frame specified in the mobile credential, issue an access token to the mobile device, and responsive to receiving a command authorized by the access token from the mobile device, route the command to a vehicle subsystem for execution.

In one or more illustrative embodiments of the present disclosure, a method for a vehicle includes receiving a vehicle credential from a server; responsive to receiving a connection request from a mobile device using a mobile credential, verifying the mobile credential with the vehicle credential; responsive to connecting with the mobile device, issuing an access token to the mobile device based on the vehicle credential; and performing a remote procedure call (RPC) requested from the mobile device, wherein at least one of the vehicle credential or the mobile credential is time-based by specifying a time frame defining a validity of the credential.

In one or more illustrative embodiments of the present disclosure, a mobile device includes a processor, programmed to send a request for vehicle including a time condition and location condition to a server; responsive to receiving a mobile credential from the server specifying a time frame defining a validity of the mobile credential and a current time being within the time frame, connect to a vehicle specified in the mobile credential; responsive to receiving an access token from the vehicle, send an RPC to the vehicle; and receive a response from the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle wireless connection system. More specifically, the present disclosure proposes a vehicle system allowing a user device to connect without manually inputting password and to access various features of the vehicle once connected within a predefined time frame.

Figure 1:
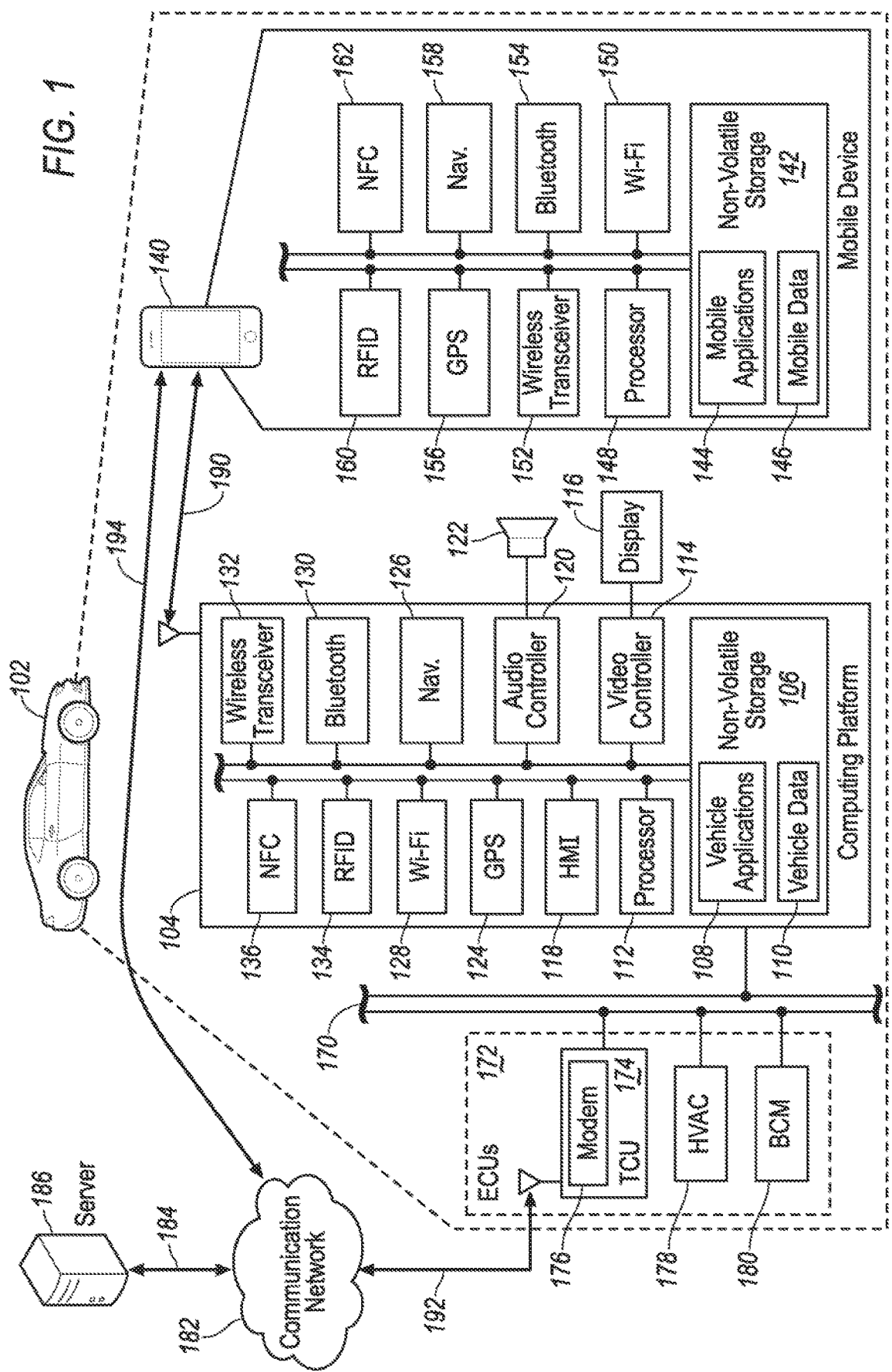
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning functions through a navigation controller 126 configured to calculate navigation routes responsive to user input via e.g., the HMI controls 118, and output planned routes and instructions via the speaker 122 and the display 116. Location data that is needed for navigation may be collected from a global positioning system (GPS) controller 124 configured to communicate with GPS satellites and calculate the location of the vehicle 102. Map data used for route planning may be stored in the storage 106 as a part of the vehicle data 110. Navigation software may be stored in the storage 116 as a part of the vehicle applications 108.

The computing platform 104 may be configured to communicate with a mobile device 140 of the vehicle users/occupants via a wireless connection 190. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 132 in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GPS controller 156.

The mobile device 140 may be provided with a wireless transceiver 152 in communication with a WiFi controller 150, a Bluetooth controller 154, a RFID controller 160, a NFC controller 162, and other controllers (not shown), configured to communicate with the wireless transceiver 132 of the computing platform 104.

The computing platform 104 may be further configured to communicate with various electronic control units (ECUs) via one or more in-vehicle network 170. The in-vehicle network 170 may include, but is not limited to, one or more of a controller area network (CAN), an Ethernet network, and a media oriented system transport (MOST), as some examples.

Vehicle 102 may include multiple ECUs 172 configured to control and operate various features of the vehicle 102. As a few non-limiting examples, the ECUs 172 may include a telematics control unit (TCU) configured to control telecommunication between vehicle 102 and a communication network 182 through a wireless connection 192 using a modem 176. The communication network 182 may be any type of wireless network such as a cellular network enabling the communication between a remote server 186 and the computing platform 104. It is noted that, the remote server 186 is used as a general term throughout the present disclosure and may refer to any cloud based services involving multiple servers, computers, devices and the like.

The ECUs 172 may further include a heat, ventilation, and air conditioning (HVAC) controller 178 configured to control and adjust the cabin temperature of the vehicle 102 by operating devices such as a fan and a compressor (not shown) using signals input from various sensors such as a temperature sensor (not shown). The ECUs 172 may further include a vehicle body control module (BCM) 180 configured to control various body functions of the vehicle 102 including door locking/unlocking, window opening/closing, and the like.

The present disclosure may be applied to various situations allowing a user to connect to the computing platform 104 and access various features of the vehicle 102 via a mobile device 140. The user may start to connection process by sending a request to the remote server 186 for a vehicle for a certain time via the mobile device. The server 186 may use multiple methods to assign a vehicle (e.g. the vehicle 102) to the user. For instance, the server 186 may assign the first available or nearest vehicle to the user at a specific time. Responsive to assigning the vehicle 102 to the user, the server 186 may create a time bound set of credentials for a wireless connection 190 and send the credentials to both the computing platform 104 and the mobile device 140 through wireless connections 192 and 194. The credentials sent to the computing platform 104 and the mobile device may be the same credential. Alternatively, the credentials sent to the computing platform 104 and the mobile device may correspond to each other although they are not the same. Various network technologies between the computing platform 104 and the mobile device 140 may be used and a common example for the wireless connection 190 may include a WiFi network. The credentials created by the server 186 may be unique to the specific wireless connection 190 between the computing platform 104 and the mobile device 140 may be bounded by the duration of the vehicle assignment. In addition, the credentials created by the server 186 may further include information necessary for the vehicle to later assign an application layer token, including any connections limitations that may be appropriate for the given scenario.

As the user approaches the assigned vehicle 102 and comes within range of the vehicle wireless network within the allocated time frame, the mobile application 144 of the mobile device 140 may attempt to connect to the computing platform 104 with the credentials issued by the server 186. Responsive to verifying the credentials to be valid, the computing platform 104 may allow the mobile device 140 to connect and a wireless connection 190 may be established. Otherwise, if the credential is invalid or the connection attempt does not fall within the allocated time frame, the computing platform 104 may deny the access attempt.

Responsive to a successful establishment of the wireless connection 190, the computing platform 104 may further issue a digital access token allowing the mobile device 140 to access vehicle subsystems including various ECUs 172 and components of the computing platform 104. Different users may have different level of access tokens. For instance, a vehicle owner may have access to vehicle subsystems a passenger does not. The vehicle owner may have access to saved contact and locations stored in the storage 106 as a part of the vehicle data 110, but those data may not be made available to a passenger. Throughout the connection session, the computing platform 104 may continue to monitor the time to determine expiration of the credentials provided by the mobile device 140. Responsive to detecting the expiration of the credentials, the computing platform 104 may disconnect the mobile device 140 from the wireless connection 190 removing the ability for the user to access internal vehicle subsystems.

Before the expiration of the credentials, the mobile device 140 may use the access token to access and interact with various features of the vehicle 102. For instance, the user may use the WiFi hotspot feature through the WiFi controller 128 to access the Internet via the TCU 174. The user may further adjust the cabin temperature via the HVAC controller 178, adjust radio volume via the audio controller 120, perform vehicle body function controls (e.g. unlocking/locking doors) via the BCM 180 and the like. The user may be able to repeat the process as many times as needed while on the network. Additionally, when multiple mobile devices 140 are connected to the computing platform 104, the credentials and access token may allow those multiple mobile devices 140 to communicate and interact with each other via the wireless connections 190 to the computing platform 104.

If the user completes the ride before his/her time-based credentials have expired, the wireless connection 190 will disconnect as he/she carrying the mobile device 140 departs from the vehicle 102 going beyond the connection range. Responsive to detecting the disconnection of the mobile device 140, the computing platform 104 may send a message to the server 186 via the TCU 174 requesting to remove the credentials. The mobile device 140 may be also configured to delete the time-based credentials from the storage 142.

At any time, the server 186 and/or the computing platform 104 may invalidate the provided user credential based on analysis of various traffic and/or identification of threat to the network or vehicle. For instance, a threat may include any unauthorized activity such as attempts to breach any network security system or to access unauthorized data, computer virus/malware, and the like. If the computing platform 104 revokes the credentials, a message may be sent to the server 186. If the server 186 revokes the credentials, a message may be sent to the computing platform 104. New credentials may be reissued and the wireless connection 190 may be reestablished.

Figure 2:
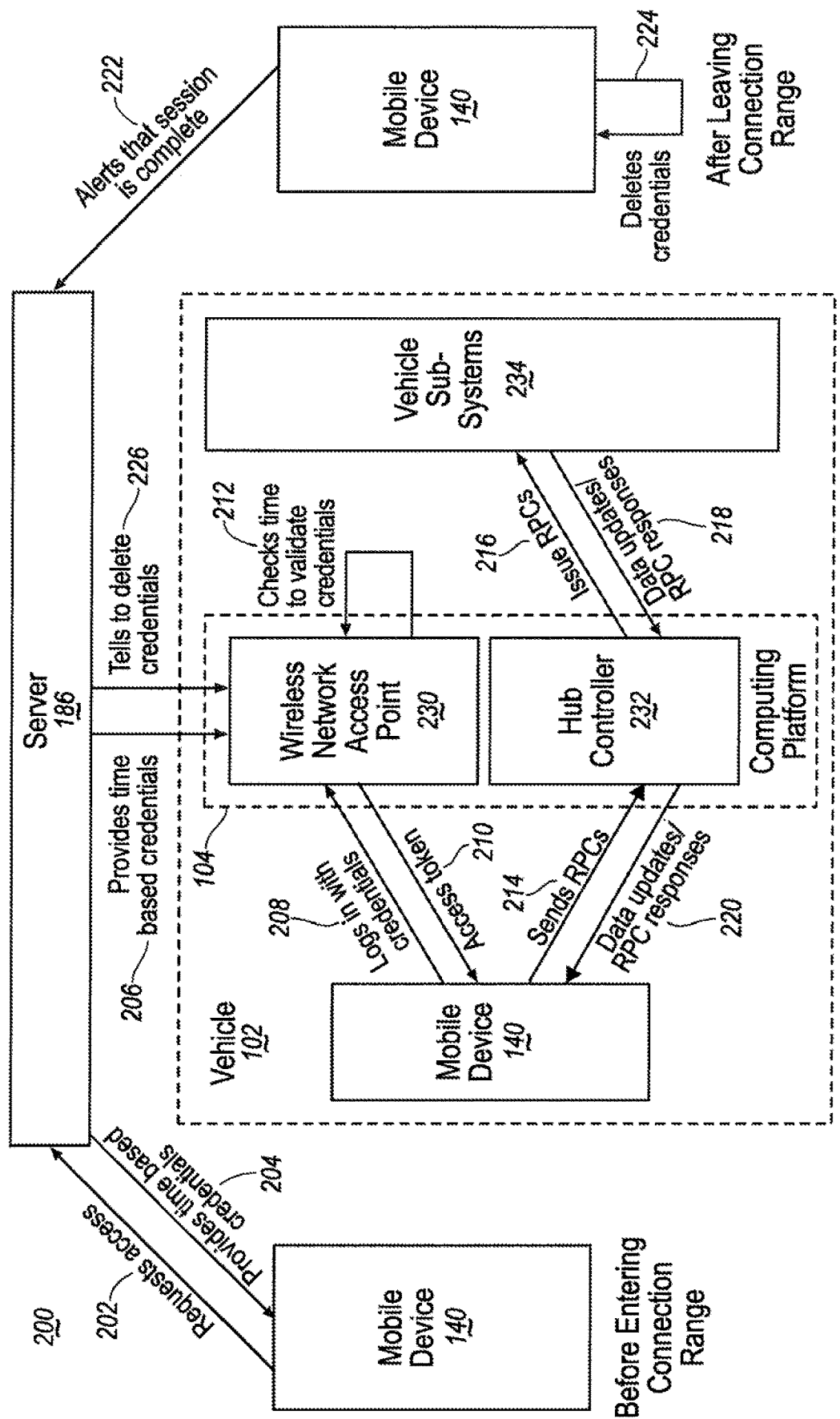
FIG. 2 illustrates a process flow diagram of the vehicle system of one embodiment of the present disclosure.

Referring to FIG. 2, a process flow diagram 200 of the vehicle system of one embodiment of the present disclosure is illustrated. With continuing reference to FIG. 1, at operation 202, before the mobile device 140 entering the connection range, the mobile device 140 sends a request for a vehicle at a certain future time frame to the server 186. The time frame may be any length of time and may vary from user to user. For instance, an owner of a vehicle may request for an unlimited time frame, while a rental vehicle customer may only request for a time frame corresponding to his/her reservation time period. In addition, the request may include further conditions of the vehicle. An owner may request for his/her own vehicle, while a rental vehicle user may request for any vehicle meeting the requested condition (e.g. number of seats) available at the requested time frame near a pickup location specified in the request. At operation 204, responsive to receiving the request from the mobile device 140, the server 186 creates time bound credentials for the wireless access after identifying the vehicle 102 meeting the requested conditions, and issues the credentials to the mobile device 140. In addition, at operation 206, the server 186 sends the time bound credentials to a wireless network access point 230 of the identified vehicle 102. The wireless network access point 230 may involve any wireless network technology supported by the vehicle 102. For instance, if the designated wireless network is a WiFi network, the wireless network access point 230 may include the wireless transceiver 132 in communication with the WiFi controller 128 of the computing platform 104.

As the mobile device 140 approaches the vehicle 102 and enters the connection range within the requested time frame, at operation 208, the mobile device 140 attempts to log in the wireless network with the credentials received from the server 186. Responsive to receiving the connection attempt from the mobile device 140 and a successful verification of credentials, the wireless network access point 230 allows the mobile device 140 to connect and issue an access token to be used with all subsequent vehicle requests at operation 210. The token issued by the wireless network access point may contain information on what vehicle subsystems 234 the connected mobile device has access to and interact with. The vehicle subsystems 234 may include various components within or in communication with the computing platform 104. For instance, the owner of the vehicle 102 may be issue the highest-level access token allowing to access predefined private features such as saved files (e.g. locations and contacts) stored in the storage 106. Whereas, a user renting the vehicle 102 may have access to common subsystem features such as adjusting vehicle temperature settings via the HVAC controller 178 and accessing to the Internet via the TCU 174, but have no access to private features. The wireless network access point 230 continues to monitor the time-based credentials and responsive to detecting expiration of the credentials, disconnect the wireless connection 190 from the mobile device 140 and deleted the time-based credentials.

After successfully connected to the computing platform 104 via the wireless network access point 230 and received the access token therefrom, at operation 214 the mobile device 140 is authorized to send remote procedure calls (RPCs) to a hub controller 232 of the computing platform 104 to make changes to current vehicle status, such as adjusting cabin temperature or speaker volume, or to request for current vehicle status such as speed and GPS location. The hub controller 232 may be implemented in various configurations. For instance, the hub controller 232 may include the processor 112 in communication with various components of the vehicle 102 configured to execute various instructions stored in the storage 106 as a part of vehicle applications 108 to perform various operations. At operation 216, responsive to receiving the RPCs from the mobile device, the hub controller 232 routes the RPCs to appropriate vehicle subsystems 234 and waits for responses. Following the examples discussed above, RPCs requesting to adjust the cabin temperature and speaker volume may be routed to the HVAC controller 178 and the audio controller 120 respectively. And RPCs requesting for vehicle speed and GPS location may be routed to a speed sensor (not shown) and the GPS controller 124 respectively. Responsive to receiving the RPC from the hub controller 232, at operation 218 the appropriate vehicle subsystem 234 performs the RPC and issue an appropriate response, such as a success or an error message, or the speed or location information following the above examples. At operation 220, the hub controller 232 routes the response back to the mobile device 140 for presenting to the user.

When the ride is complete and the time bound credentials have not yet expired, the user may leave the vehicle 102 while carrying the mobile device 140. At operation 222, the mobile device sends an alert to the server 186 indicating the connection session is complete responsive to disconnecting from the wireless network access point 230 beyond the connection range. At operation 224, the mobile device 140 further deletes the time-based credentials preventing the mobile device 140 from reconnecting to the wireless network. Sometimes the user leaves the vehicle 102 temporarily and intends to comeback and continue to use the vehicle 102. In these situations, a predefined grace period (e.g. 5 minutes) may be used by the mobile device 140 to prevent inconvenience. For instance, the mobile device 140 may start a timer once disconnected from the vehicle 102 and only perform operations 222 and 224 after the timer has expired. At operation 226, responsive to receiving the alert from the mobile device 140, the server 186 issues a RPC to the wireless network access point 230 instructing to delete the time-based credentials.

Figure 3A:
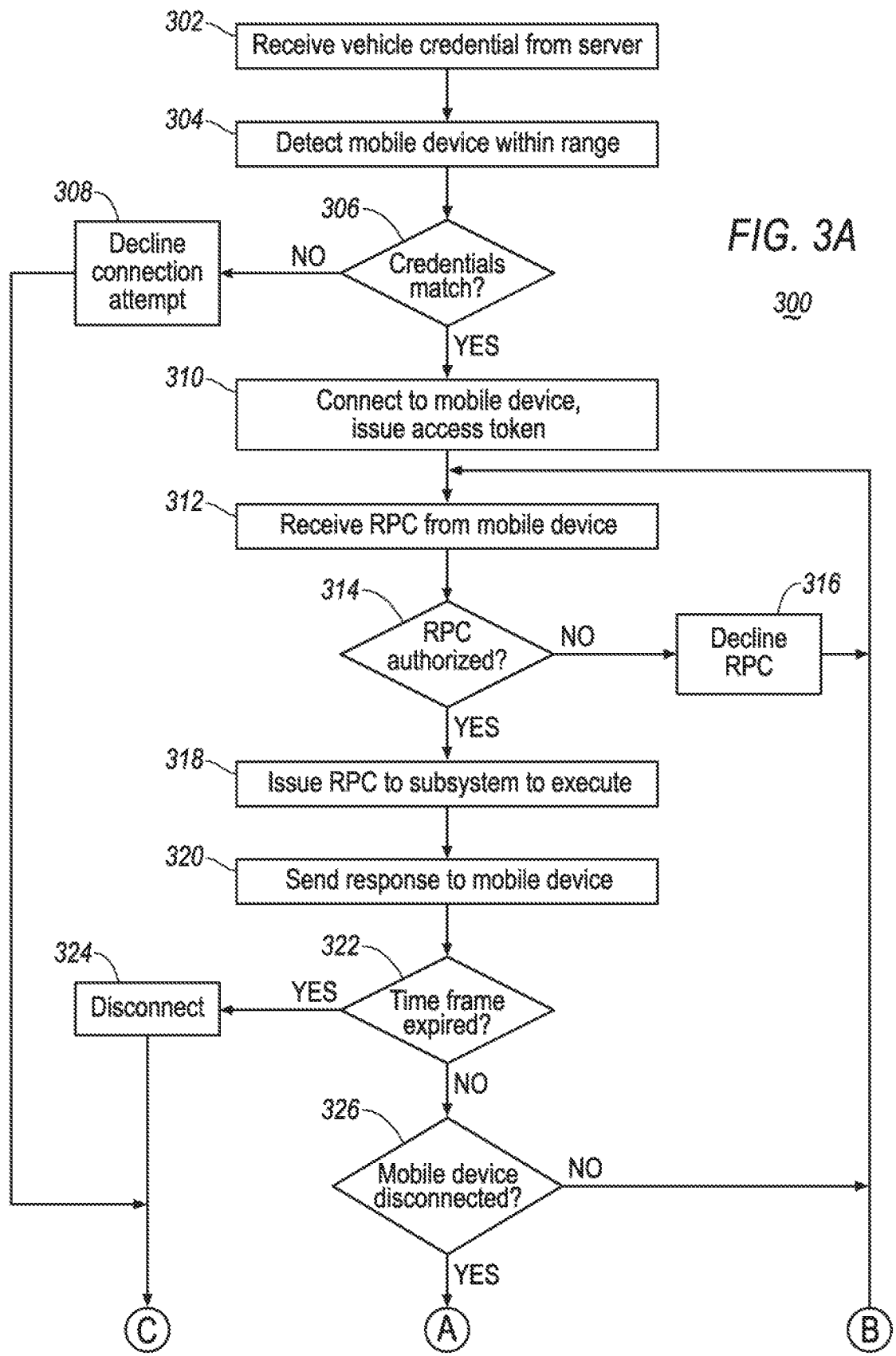
FIGS. 3A and 3B illustrate a flow diagram for a process on the vehicle of one embodiment of the present disclosure.
Figure 3B:
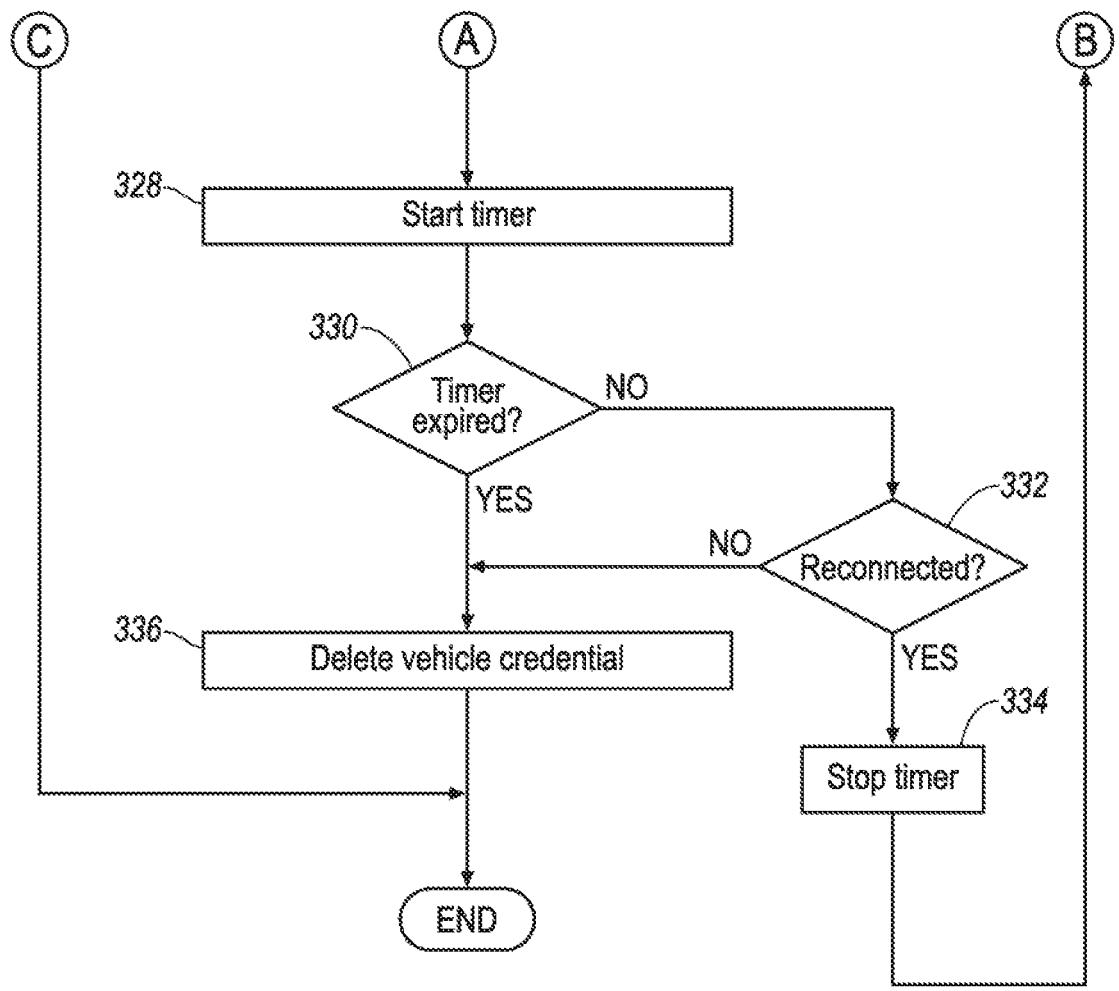

With reference to FIGS. 3A and 3B, a flow diagram for a process 300 implemented on the vehicle is illustrated. At operation 302, the computing platform 104 receives a vehicle credential for a wireless network from a server 186 and stores the vehicle credential into the storage 106. The vehicle credential may be a time bound credential including a time frame within which the credential is valid. Responsive to detecting a mobile device 140 within the range of the wireless network attempting to connect with a mobile credential at operation 304, the computing platform 104 verifies if the mobile credential received from the mobile device 140 matches with the vehicle credential received from the server 186 at operation 306. As an example, the mobile credential and the vehicle credential may be the same. Alternatively, the mobile credential and the vehicle credential may correspond to each other with an algorithm although they are not the same. If the credentials do not match or the current time is beyond the time frame (e.g. too early or too late), the process proceeds to operation 308 and the computing platform 104 declines the connection attempts from the mobile device 140. Otherwise, if the mobile credential matches with the vehicle credential within the time frame, the process proceeds to operation 310. The computing platform 104 allows the mobile device 140 to connect and issues an access token based on the vehicle credential and/or mobile credential to the mobile device 140.

After successfully establishing the wireless connection 190, at operation 312, the computing platform 104 receives an RPC from the mobile device 140 requesting to make changes to current vehicle status, or to request for current vehicle status. Responsive to receiving the RPC from the mobile device 140, the computing platform 104 verifies whether the RPC is authorized by the access token. If the RPC is not authorized, the process proceeds to operation 316 and the computing platform 104 declines the RPC. Otherwise, if the RPC is authorized by the access token, the process proceeds to operation 318 and the computing platform 104 issues the RPC to an appropriate subsystem 234 to execute. Responsive to receiving the RPC, the subsystem 234 performs the RPC and issue a response which may include the requested information, or success/error message. At operation 320, the computing platform 104 sends the response to the mobile device 140.

In case that the vehicle credential and/or the mobile credential is time bound and only valid within a predefined time frame, the computing platform 104 checks if the predefined time frame has expired at operation 322. Responsive to detecting the time frame has expired, the process proceeds to operation 324 and the computing platform 104 disconnect from the mobile device 140. Additionally, the computing platform 104 may delete the vehicle credential from the storage 106 to prevent future reconnection. If the time frame has not expired, the process proceeds to operation 326 and the computing platform 104 checks if the mobile device 140 has disconnected. If the mobile device has not disconnected, suggesting the user is still using the vehicle 102, the process returns to operation 312. Otherwise, responsive to detecting the mobile device 140 has disconnected, the process proceeds to operation 328 and the computing platform 104 starts a timer for a predefined time period. At operation 330, the computing platform 104 checks whether the timer has expired. If the mobile device 140 is reconnected to the computing platform 104 at any time before the timer expires, the process proceeds from operation 332 to operation 334 to stop the timer, and returns to operation 312 to repeat the process. Otherwise, if the mobile device 140 fails to reconnect to the computing platform 104 within the predefined time period, suggesting the user has finished his/her ride, the process proceeds to operation 336 and the computing platform 104 deletes the vehicle credential from the storage 106.

Figure 4A:
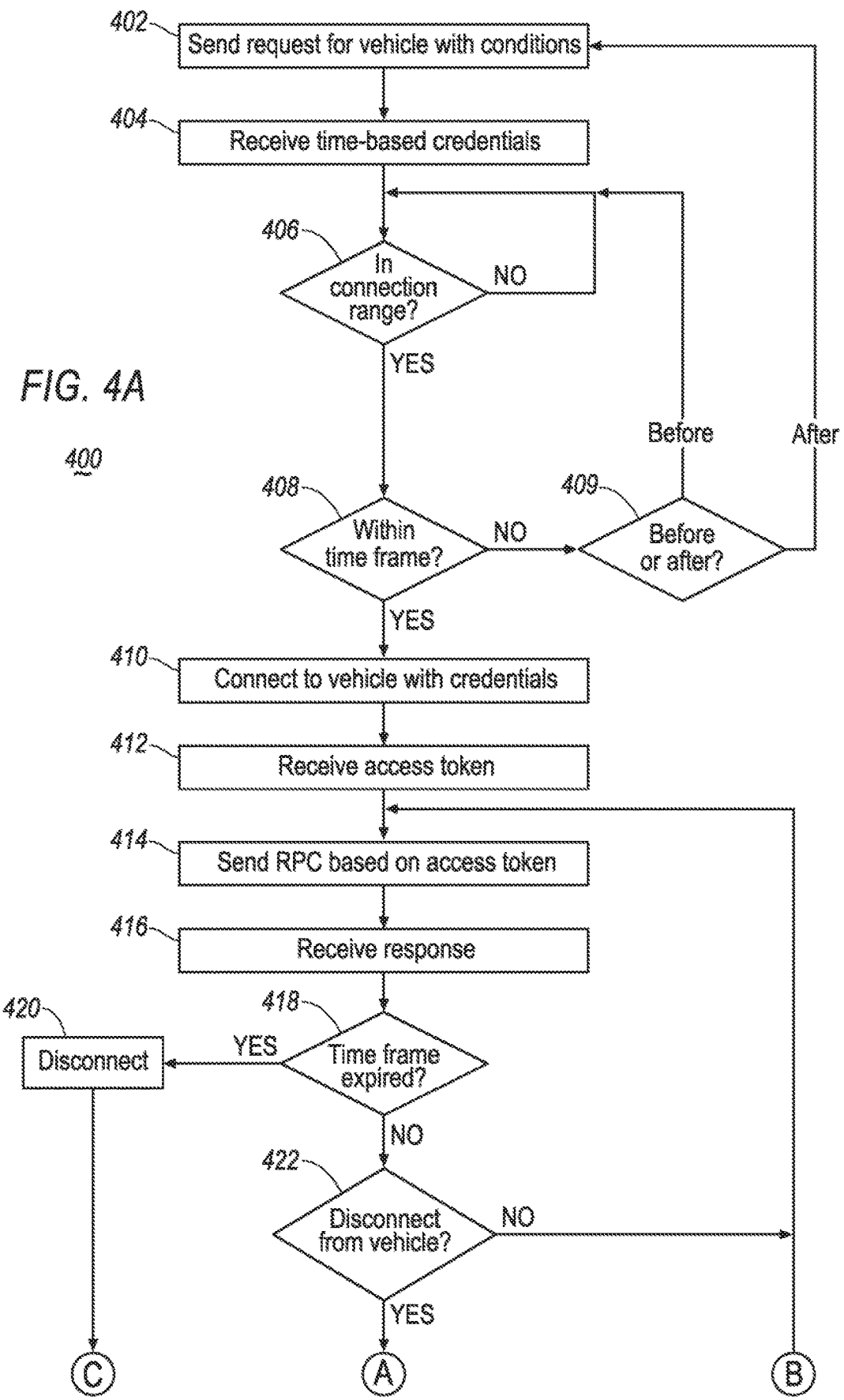
FIGS. 4A and 4B illustrate a flow diagram for a process on a mobile device of one embodiment of the present disclosure.
Figure 4B:
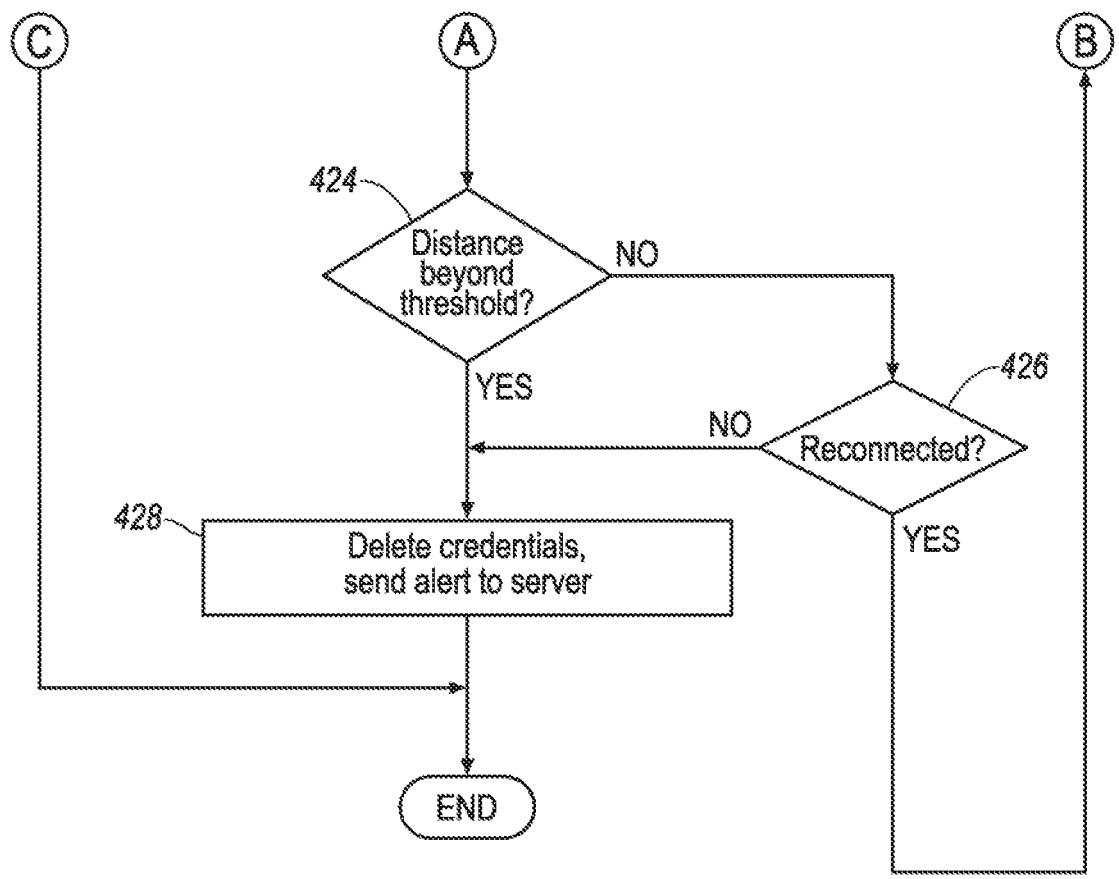

With reference to FIGS. 4A and 4B, a flow diagram for a process 400 implemented on the mobile device is illustrated. At operation 402, the mobile device 140 sends a request for vehicle to the server 186. The request may be sent along with various conditions including a time condition and a location condition. The request may further include additional conditions such as number of seats, disabled access and the like. At operation 404, the mobile device 140 receives a time-based mobile credential assigning the vehicle 102 to the mobile device 140 for a specific time frame. At operation 406, the mobile device 140 checks it is within the connection range of the computing platform 104 of the assigned vehicle 102 via the wireless transceiver 152. Additionally or alternatively, the mobile device 140 may use location data from the GPS controller 156 to determine if the distance between the mobile device 140 and the computing platform 104 is within a predefined connection range. Responsive to detecting the mobile device 140 is within the network connection range of the computing platform 104, the process proceeds to operation 408 and the mobile device 140 further verifies whether the current time is within the time frame specified in the time-based mobile credential. If the current time is not within the time frame, at operation 409, the mobile device 140 further verifies if the current time is before or after the allocated time frame. If the current time is before the allocated time frame indicating it is too early too early to connect, the process returns to operation 406 and the mobile device 140 waits. Otherwise, if it is too late to connect, the process returns to operation 402 to resend the request. If the answer for operation 408 is a yes, the process proceeds to operation 410 and the mobile device 140 connects to the computing platform 104 with the time-based mobile credential.

Responsive to successfully connecting to the computing platform 104, at operation 412, the mobile device 140 receives an access token from the computing platform 104. The security token defines what level of authorization the mobile device 140 is given to access to and interact with subsystems of the vehicle 102. Authorized actions may be enabled on the mobile device 140, while unauthorized actions may be disabled preventing the user from initiating such commands or RPCs. At operation 414, the mobile device initiates and sends to the computing platform 104 an RPC based on the access token to make changes to current vehicle status, or to request for current vehicle status via a subsystem 234. At operation 416, the mobile device 140 receives a response from the computing platform 104. The response may include a success or error message indicating the change to current vehicle status has succeeded or failed, or information about the requested current vehicle status.

Since the mobile credential issued by the server 186 is time-based and only valid within the specified time frame, at operation 418, the mobile device 140 checks whether the time frame has expired. If the time frame has expired, the process proceeds to operation 420 and the mobile device 140 disconnect from the computing platform. Additionally, the mobile device 140 may delete the mobile credential from the storage 142. If the time frame has not expired, the process proceeds to operation 422 and to determine whether the mobile device 140 has already disconnected from the computing platform 104 of the assigned vehicle 102. If the answer is a no, suggesting the user is still using the vehicle 102, the process returns to operation 414 to repeat the process. Otherwise, if the mobile device 140 has already disconnection from the computing platform 104, the mobile device 140 further determines whether the user has completed the ride, or he/she is just temporarily leaving the connection range from the vehicle and intends to come back and continue his/her ride. This may be performed at operation 424 by detecting the distance between the mobile device 140 and the computing platform 104 via the GPS controllers 156 and 124. A predefined distance threshold (e.g. 100 meters) may be used. If the mobile device 140 reconnects to the computing platform 104 before going beyond the threshold distance, the process returns from operation 426 to operation 414 to repeat the process. Otherwise, responsive to the mobile device 140 departing form the computing platform 104 beyond the threshold distance, or the mobile device 140 fails to reconnect to the computing platform 104, the process proceeds to operation 428. The mobile device deletes the mobile credential from the storage 142 and sends an alert to the server 186.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising
a controller, programmed to
receive a vehicle credential from a server, wherein the vehicle credential is associated with a mobile credential,
responsive to detecting a connecting attempt from a mobile device with the mobile credential, verify the mobile credential using the vehicle credential,
responsive to a successful verification and wirelessly connecting to a mobile device with the mobile credential issued from a server within a time frame specified in the mobile credential, issue an access token to the mobile device using the vehicle credential, wherein the access token specifies an access authority to a plurality of vehicle subsystems,
responsive to receiving a command from the mobile device verify if the command is authorized by the access token, and
responsive to a successful verification, route the command to a vehicle subsystem for execution.

2. The vehicle of claim 1, wherein the controller is further programmed to, responsive to receiving a delete instruction from the server, delete the vehicle credential.

3. The vehicle of claim 1, wherein the controller is further programmed to, responsive to detecting a predefined threat initiated from the mobile device, disconnect from the mobile device and delete the vehicle credential.

4. The vehicle of claim 1, wherein the controller is further programmed to:
responsive to detecting a disconnection of the controller from the mobile device, start a timer for a predefined time period, and
responsive to detecting an expiration of the timer and a failure to reconnect by the mobile device, delete the vehicle credential.

5. The vehicle of claim 1, wherein the controller is further programmed to, responsive to detecting an expiration of the mobile credential defined by the time frame, disconnect from the mobile device.

6. The vehicle of claim 1, wherein the controller is further programmed to, responsive to receiving a response signal from the vehicle subsystem, send the response signal to the mobile device.

7. The vehicle of claim 1, wherein the mobile device is wirelessly connected to the controller using at least one of the following technologies: WiFi, near-field communication (NFC), or radio-frequency identification (RFID).

8. A method for a vehicle, comprising:
receiving a vehicle credential from a server, wherein the vehicle credential is associated with a mobile credential;
responsive to receiving a connection request from a mobile device using a mobile credential, verifying the mobile credential with the vehicle credential;
responsive to a successful verification and connecting with the mobile device, issuing an access token to the mobile device based on the vehicle credential, wherein the access token specifies an access authority to perform a remote procedure call (RPC) to a vehicle subsystem; and responsive to receiving an verifying a RPC from the mobile device, perform the RPC via the vehicle subsystem, wherein at least one of the vehicle credential or the mobile credential is time-based by specifying a time frame defining a validity of the credential.

9. The method of claim 8, further comprising:
responsive to detecting an expiration of the time frame, disconnecting the mobile device and delete the vehicle credential.

10. The method of claim 8, further comprising:
responsive to detecting the RPC is not authorized by the access token, declining to perform the RPC.

11. The method of claim 8, further comprising:
responsive to detecting a current time beyond the time frame, declining to the connection request from the mobile device.

12. The method of claim 8, further comprising:
responsive to detecting a disconnection from the mobile device, starting a timer for a predefined time period, and responsive to detecting an expiration of the timer and a failure to reconnect by the mobile device, deleting the vehicle credential.

13. A mobile device, comprising:
a processor, programmed to
send a request for vehicle including a time condition and location condition to a server;

responsive to receiving a mobile credential from the server specifying a time frame defining a validity of the mobile credential and a current time being within the time frame, connect to a vehicle specified in the mobile credential;

responsive to receiving an access token from the vehicle, send a remote procedure call (RPC) to the vehicle; and receive a response from the vehicle.

14. The mobile device of claim 13, wherein the processor is further programmed to, responsive to detecting an expiration of the time frame, disconnect from the vehicle and delete the mobile credential.

15. The mobile device of claim 13, wherein the processor is further programmed to, responsive to detecting a second mobile device connected to the vehicle, communicate with a second mobile device using the access token via the vehicle.

16. The mobile device of claim 13, wherein the processor is further programmed to, responsive to detecting a distance between the mobile device and the vehicle extending beyond a predefined threshold, delete the mobile credential and send an alert to the server.

17. The mobile device of claim 13, wherein the processor is further programmed to, responsive to detecting a disconnection of the mobile device from the vehicle for long than a predefined time period and a failure to reconnect by to the vehicle, delete the mobile credential and send an alert to the server.

* * * * *